United States Patent [19]
Katoh et al.

[11] Patent Number: 5,141,992
[45] Date of Patent: Aug. 25, 1992

[54] PHENOLIC RESIN COMPOSITION WITH EXCELLENT IMPACT STRENGTH

[75] Inventors: Ken Katoh, Fujieda; Keiji Ooi, Shizuoka; Shinji Ikeda, Fujieda, all of Japan

[73] Assignee: Sumitomo Bakelite Company Limited, Tokyo, Japan

[21] Appl. No.: 599,562

[22] Filed: Oct. 18, 1990

[30] Foreign Application Priority Data

Oct. 24, 1989 [JP] Japan .................................. 1-274856

[51] Int. Cl.⁵ .................... C08F 8/00; C08L 61/00; C08L 61/06; C08L 61/34
[52] U.S. Cl. .................................. 525/135; 524/511; 525/139

[58] Field of Search ................. 524/511; 525/135, 139

[56] References Cited

U.S. PATENT DOCUMENTS 4,725,650  2/1988  Landi et al. ......................... 524/494

Primary Examiner—Paul R. Michl
Assistant Examiner—U. K. Rajguru
Attorney, Agent, or Firm—Browdy and Neimark

[57] ABSTRACT

A phenolic resin composition comprising 20–40 parts by weight of a resole type phenolic resin, 5–15 parts by weight of a novolac type phenolic resin, 3–10 parts by weight of a carboxy-modified acrylonitrile-butadiene rubber and 35–65 parts by weight of an inorganic filler.

20 Claims, No Drawings

PHENOLIC RESIN COMPOSITION WITH EXCELLENT IMPACT STRENGTH

FIELD OF THE INVENTION

The present invention relates to a phenolic resin composition which is injection-moldable, which is well balanced in heat resistance, static strengths (e.g., flexural strength and tensile strength) and impact strength, and which is obtained by compounding a resole type phenolic resin with a novolac type phenolic resin, a carboxy-modified NBR (acrylonitrile-butadiene rubber) and an inorganic filler.

RELATED ART STATEMENT

Phenolic resin compositions are superior in heat resistance, dimensional stability, moldability, etc. and have actually been used over a long period of time in basic industries such as automobile industry, electric industry, electronics industry and the like. Since change of automobile metal parts made of iron, aluminum, zinc, etc. to molded plastic parts made of glass fiber-reinforced phenolic resins of high strength can achieve substantial cost reduction, active studies have recently been made on the switch-over of metal to phenolic resin particularly in automobiles. Actual production of disc brake pistons of four wheels, stator of torque converter, etc. with phenolic resin is already under way in the U.S.; and also in Japan, actual production of disc brake pistons of two wheels, various motor housings, fuel pump impeller, accumulator piston of AT vehicles, etc. is under way.

Thermosetting resin compositions such as phenolic resin compositions and the like, however, are inherently inferior in impact strength (in short, they tend to break when dropped), and this inferior property can be viewed as a reason that the replacement of metal parts with said compositions has not attained substantial progress.

Numerous attempts have been made to eliminate the above drawback. For example, a phenolic resin molding material obtained by mixing a phenolic resin with a reinforcing material such as glass fiber, organic fiber or the like by use of Henschel mixer, super mixer or the like, gives a molded article of relatively high impact strength (5–12 kgf·cm/cm$^2$ in Charpy impact strength). However, in this material, impregnation of the reinforcing material (e.g., glass fiber and organic fiber) by the resin is poor, and accordingly the molded article obtained therefrom has poor static strengths.

Moreover, a molding material obtained by impregnating a glass roving with a phenolic varnish, drying the resulting glass roving to remove the solvent and to obtain a prepreg and cutting the prepreg into an appropriate length, gives a molded article having a very high Charpy impact strength of 50–100 kgf·cm/cm$^2$. However, in obtaining the molded article, only compression molding can be employed and, moreover, the resulting molded article has poor static strengths as in the case of the molded article produced from the chip material.

Furthermore, a molding material obtained from rolls or an extruder gives a molded article of superior static strengths but of Charpy impact strength of as low as 5–7 kgf·cm/cm$^2$, though the Charpy impact strength varies depending upon the type of the reinforcing material used.

As described above, there has been obtained yet n phenolic resin material which is injection-moldable and which is superior in heat resistance and balanced in static strengths and impact strength.

OBJECT AND SUMMARY OF THE INVENTION

Of automobile parts, the parts used in the engine compartment are exposed to vibration of 3–40 G, temperatures of 150–200° C. and external (environmental) conditions such as being hit by stones during running. In order to replace the metal parts with resin parts, the latter must have properties withstanding the above internal and external conditions. We made extensive study for the sake of providing a material usable for such a resin part, and as a result have found a phenolic resin composition which is injection-moldable at high productivity and which is superior in heat resistance and well balanced in static strengths and impact strength.

That is, the present invention provides a phenolic resin composition comprising 20–40 parts by weight of a resole type phenolic resin, 5–15 parts by weight of a novolac type phenolic resin, 3–10 parts by weight of a carboxy-modified acrylonitrile-butadiene rubber and 35–65 parts by weight of an inorganic filler.

DETAILED DESCRIPTION OF THE INVENTION

The resole type phenolic resin used in the present invention (said resin is hereinafter referred to as "resole") can be a dimethylene ether type, a methylol type or a combination thereof. The resole preferably has a softening point of 70° C. or more as measured by the ball and ring method.

The novolac type phenolic resin (hereinafter referred to as "novolac") can generally be of any molecular weight; however, a novolac having a weight-average molecular weight of 4,000 or more can be used preferably, and a novolac having a weight-average molecular weight of 5,000–9,000 is particularly preferable. The novolac is used in combination with the resole for a purpose of obtaining a stable molding material. The other purpose of novolac use is to obtain a cured product of improved toughness. For example, when the phenolic resin consists of only the resole, no substantial improvement in impact strength can be expected and flow control in obtaining a molding material is difficult. When the novolac is used in combination with the resole, the larger the weight-average molecular weight of the novolac, the higher is the impact strength of the resulting molding material. That is, when a high-molecular novolac having a weight-average molecular weight of 4,000 or more is used in combination with the resole, the molding material is considered to give a uniform cured product and not an agglomerate or heterogeneous mixture of cured microparticles.

When the weight-average molecular weight of the novolac is more than 9,000, the phenolic resin has too high a viscosity, making it difficult to obtain a molding material. Even if a molding material can be obtained, injection molding of the material tends to be very difficult.

The ortho bond/para bond ratio (o/p ratio) in the novolac is not particularly restricted.

The allowable ratio of resole to novolac is about 55/45 to about 90/10, and the ratio of 70/30 to 80/20 is effective. A higher proportion of resole reduces impact strength, and a higher proportion of novolac lowers curability.

The carboxy-modified NBR (acrylonitrile-butadiene rubber) is not particularly restricted; however, a carboxy-modified NBR having a SP value (solubility parameter) of 9-10 and being solid at room temperature can be used preferably. Since the SP values of polybutadiene and nitrile rubber are respectively 8.5 and 9.5 according to the relevant literature, there can be used a carboxy-modified NBR wherein the ratio of carboxyl group, butadiene and acrylonitrile bonded is controlled so as to give a SP value of 9-10. It is known that the carboxyl group reacts with the methylol group of the resole resin. Accordingly, this carboxyl group has an effect of improving the dispersion state (micro phase dispersion structure) of the carboxy-modified NBR which has reacted with the resole or the novolac. Thus, the presence of the carboxyl group is significant. Generally, the proportion of carboxyl group is preferably about 2-10 mole %. When the proportion is less than 2 mole %, the effect by the presence of carboxyl group is small. When the proportion is more than 10 mole %, the resulting composition has inferior flow property. 3-6 mole % is particularly preferable. The molecular weight of the carboxy-modified NBR has no particular restriction; however, a carboxy-modified NBR which is solid at room temperature and has a number-average molecular weight of about 250,000-350,000 is preferred, in view of workability at a kneading temperature (100° C.) employed to obtain a molding material. The amount of the carboxy-modified NBR used is preferably 3-10% by weight based on the total composition, because when the amount is less than 3%, the effect of improvement in impact strength by said NBR is small and, when the amount is more than 10%, heat resistance is low.

As the inorganic filler, there can be used calcium carbonate, calcined clay, uncalcined clay, mica, silica, wollastonite, magnesium hydroxide, aluminum hydroxide, glass fiber, alumina fiber, etc. These fillers can be used alone or in combination. The use of a fiber (e.g., glass fiber or alumina fiber) in an amount of at least 50% by weight based on the inorganic filler, is more effective.

The use of a silane coupling agent such as aminosilane, epoxysilane or the like in order to increase the adhesion between filler and resin, is effective for improvement of strength and heat resistance.

The phenolic resin composition of the present invention which is injection-moldable and well balanced in static strengths (e.g., flexural strength and tensile strength), impact strength and heat resistance, comprises 20-40 parts by weight, preferably 20-30 parts by weight of a resole, 5-15 parts by weight of a novolac, 3-10 parts by weight of a carboxy-modified NBR, 35-65 parts by weight, preferably 40-55 parts by weight of an inorganic filler, and other additives generally used in phenolic resin molding materials, such as pigment, releasing agent, curing accelerator and the like, and can be produced by uniformly mixing said materials, kneading by, for example, a kneader such as rolls, co-kneader, double-shaft extruder or the like with heating, and then grinding the kneaded product.

The ratio of resole and novolac is preferably 70/30 to 80/20, as mentioned above. When the total amount of these phenolic resins is less than 25 parts by weight, the moldability of the resulting composition is poor because of too low content of resin, and the molded article produced therefrom is inferior in various properties. When said total amount is more than 55 parts by weight, the workability in obtaining a molding material is poor and the amount of volatile matters generated during curing is large, making difficult the injection molding of the molding material. Further, the resulting molded article tends to show high mold shrinkage and low strengths.

When required, it is possible to extrude the kneaded product before cooling and then pelletize it by a pelletizer.

The phenolic resin composition intended by the present invention can be obtained by compounding a resole resin with a novolac resin, particularly a high-molecular novolac resin having a weight-average molecular weight of 4,000 or more, a carboxy-modified NBR and an inorganic filler, is injection-moldable, and gives a molded article having excellent mechanical strengths (particularly, excellent impact strength) and good heat resistance. Hence, the molded article can be applied to parts of starter motor used in automobile engine room, commutator requiring heat resistance and strength, etc. and can materialize large-scale switch-over of metal parts (e.g., automobile metal parts) to plastic parts.

DESCRIPTION OF PREFERRED EMBODIMENTS

The present invention is illustrated specifically below by way of Examples.

EXAMPLE 1

There were uniformly mixed (A) 25.5 parts by weight of a dimethylene ether type resole (PR-53529 manufactured by SUMITOMO DUREZ), (B) 10.5 parts by weight of a novolac having a weight-average molecular weight of 6,500 (the molar ratio of phenol/formaldehyde fed=0.88, oxalic acid catalyst, o/p ratio=0.75), (C) 8 parts by weight of a carboxy-modified NBR (PNC-25 manufactured by Japan Synthetic Rubber Co., Ltd.) having a SP value of 9.3 and a carboxyl group content of 4 mole %, (D) 51.5 parts by weight of a glass fiber (ECS015B191H manufactured by Nihon Denki Glass) and (E) 4.5 parts by weight of a pigment, a releasing agent and others. The mixture was kneaded by rolls with heating to obtain a molding material.

EXAMPLE 2

There were kneaded by a double-shaft extruder (A) 30 parts by weight of a methylol type resole (PR-51723 manufactured by SUMITOMO DUREZ), (B) 10 parts by weight of a novolac having a weight-average molecular weight of 5,000 (the molar ratio of phenol/formaldehyde fed=0.83, hydrochloric acid catalyst, o/p ratio=0.73), (C) 5 parts by weight of PNC-25, (D) 50 parts by weight of a glass fiber (RES015BM38 manufactured by Nihon Glass Fiber) and (E) 5.0 parts by weight of a pigment, a releasing agent and others. The kneaded product was pelletized by a pelletizer to obtain a molding material.

EXAMPLE 3

There were uniformly mixed (A) 25 parts by weight of a methylol type resole (PR-51141 manufactured by SUMITOMO DUREZ), (B) 8 parts by weight of a novolac having a weight-average molecular weight of 5,000 (same as component B in Example 2), (C) 7 parts by weight of a carboxy-modified NBR NIPPOL 1072 manufactured by Nippon Zeon Co., Ltd.), (D) 30 parts by weight of a glass fiber (ECS015B154H manufactured by Nihon Denki Glass), (E) 25 parts by weight of uncalcined clay and (F) 5.0 parts by weight of a pigment, a releasing agent and others. The mixture was treated by rolls to obtain a molding material.

EXAMPLE 4

There were uniformly mixed (A) 25 parts by weight of a dimethylene ether type resole (PR-53529 manufactured by SUMITOMO DUREZ), (B) 10 parts by weight of a novolac having a weight-average molecular weight of 6,500 (same as component B in Example 1), (C) 8 parts by weight of NIPPOL 1072, (D) 20 parts by weight of calcined clay, (E) 32 parts by weight of wollastonite and (F) 5 parts by weight of a pigment, a releasing agent and others. The mixture was kneaded by a double-shaft extruder and pelletized by a pelletizer.

COMPARATIVE EXAMPLE 1

There were uniformly mixed (A) 17 parts by weight of a dimethylene ether type resole (PR-53529 manufactured by SUMITOMO DUREZ), (B) 17 parts by weight of a methylol type resole (PR-51723 manufactured by SUMITOMO DUREZ), (C) 5 parts by weight of PNC-25, (D) 55 parts by weight of a glass fiber (RES015BM38 manufactured by Nihon Glass Fiber) and (E) 6 parts by weight of a pigment, a releasing agent and others. The mixture was treated by rolls to make a molding material.

COMPARATIVE EXAMPLE 2

There were uniformly mixed (A) 25 parts by weight of a methylol type resole (PR-51141 manufactured by SUMITOMO DUREZ), (B) 8 parts by weight of a novolac having a weight-average molecular weight of 5,000 (same as component B in Example 2), (C) 8 parts by weight of a carboxy-unmodified NBR (PNC-38 manufactured by Japan Synthetic Rubber Co., Ltd), (D) 30 parts by weight of a glass fiber (ECS015B154H manufactured by Nihon Denki Glass), (E) 25 parts by weight of uncalcined clay and (F) 5 parts by weight of a pigment, a releasing agent and others. The mixture was treated by rolls to make a molding material.

COMPARATIVE EXAMPLE 3

There were uniformly mixed (A) 34 parts by weight of a random novolac having a weight-average molecular weight of 4,500 (o/p ratio=0.70), (B) 6 parts by weight of hexamethylenetetramine, (C) 8 parts by weight of PNC-25, (D) 47 parts by weight of a glass fiber (RES015BM38 manufactured by Nihon Glass Fiber) and (E) 5 parts by weight of a pigment, a releasing agent and others. The mixture was treated by rolls to make a molding material.

The materials obtained in Examples 1–4 and Comparative Examples 1–3 were measured for the following physical properties.

(1) Charpy impact strength

A test piece obtained by transfer molding was subjected to aging at 180° C. for 8 hours and then measured for Charpy impact strength by a Charpy impact tester in accordance with JIS K 6911.

(2) Flexural strength, flexural modulus and tensile strength,

A test piece obtained by transfer molding was subjected to aging at 180° C. for 8 hours and then measured for the subject items by a tensilometer manufactured by Toyo Baldwin in accordance with JIS K 6911.

(3) Thermal deformation temperature

A test piece obtained by transfer molding was subjected to aging at 180° C. for 8 hours and then measured for thermal deformation temperature by a thermal deformation temperature tester manufactured by Toyo Seiki in accordance with JIS K 6911.

(4) Injection moldability

Continuous moldability was evaluated by an injection molding machine, IR-100E manufactured by Toshiba Machine Co., Ltd.

The results are shown in Table 1 and Table 2.

TABLE 1

| Physical properties | Unit | Example 1 | Example 2 | Example 3 | Example 4 |
|---|---|---|---|---|---|
| Charpy impact strength | kgfcm/cm² | 11.5 | 9.0 | 8.0 | 6.5 |
| Flexural strength | kgf/mm² | 24.0 | 23.0 | 20.0 | 17.0 |
| Flexural modulus | kgf/mm² | 1400 | 1500 | 1600 | 1600 |
| Tensile strength | kgf/mm² | 11.0 | 10.0 | 8.0 | 7.0 |
| Thermal deformation temperature | °C. | 285 | 275 | 280 | 290 |
| Injection moldability* | — | ○ | ⊚ | ○ | ⊚ |

*⊚: Continuous moldability and appearance have no problem.
○: Continuous moldability has no problem, but appearance lacks in luster slightly.

TABLE 2

| Physical properties | Unit | Comparative Example 1 | Comparative Example 2 | Comparative Example 3 |
|---|---|---|---|---|
| Charpy impact strength | kgfcm/cm² | 4.5 | 4.0 | 4.5 |
| Flexural strength | kgf/mm² | 14.0 | 16.0 | 17.0 |
| Flexural modulus | kgf/mm² | 1200 | 1100 | 1600 |
| Tensile strength | kgf/mm² | 6.0 | 7.0 | 7.0 |
| Thermal deformation temperature | °C. | 245 | 235 | 210 |
| Injection moldability* | — | ○ | ○ | ○ |

*⊚: Continuous moldability and appearance have no problem.
○: Continuous moldability has no problem, but appearance lacks in luster slightly.

Incidentally, the physical properties of the raw materials used in preparing molding materials were measured as follows.

(1) SP value

The value by P. A. Small was used.

(2) Weight-average molecular weight

Measured by GPC (JIS K 0124, solvent=THF).

(3) O/p ratio (ortho bond/para bond ratio)

The proton of methylene group was determined by NMR, followed by calculation using the following formula.

$$o/p \text{ ratio} = (\tfrac{1}{2} \text{ orthomethylolmethylene proton} + \text{ ortho-ortho bond methylene proton} + \tfrac{1}{2} \text{ ortho-para bond methylene proton})/ (\tfrac{1}{2} \text{ paramethylolmethylene proton} + \text{ para-para bond methylene proton} + \tfrac{1}{2} \text{ ortho-para bond methylene proton})$$

The comparative examples show that:

(CE1) the presence of novolac is essential;

(CE2) carboxy-unmodified NBR cannot replace carboxy-modified NBR; and (CE3) the presence of resole is essential, and it cannot be replaced with hexamethylenetetramine, a crosslinking agent.

What is claimed is:

1. A phenolic resin composition consisting essentially of 20-40 parts by weight of a resole type phenolic resin, 5-15 parts by weight of a novolac type phenolic resin, 3-10 parts by weight of a carboxy-modified acrylonitrile-butadiene rubber and 35-65 parts by weight of an inorganic filler.

2. A composition according to claim 1, wherein the resole type phenolic resin is a dimethylene ether resole type phenolic resin or a methylol resole type phenolic resin or a mixture thereof.

3. A composition according to claim 1, wherein the resole type phenolic resin has a softening point of 70° C. or more as measured by the ball and ring method.

4. A composition according to claim 1, wherein the novolac type phenolic resin has a weight-average molecular weight of 4,000-9,000.

5. A composition according to claim 1, wherein the weight ratio of the resole type phenolic resin to the novolac type phenolic resin is 70/30 to 80/20.

6. A composition according to claim 1, wherein the carboxy-modified acrylonitrile-butadiene rubber has a solubility parameter of 9-10.

7. A composition according to claim 1, wherein the proportion of carboxyl group in the carboxy-modified acrylonitrile-butadiene rubber is 2-10 mole %.

8. A composition according to claim 1, wherein the carboxy-modified acrylonitrile-butadiene rubber has a number-average molecular weight of about 250,000-350,000.

9. A composition according to claim 1, wherein the inorganic filler is selected from the group consisting of calcium carbonate, calcined clay, uncalcined clay, mica, silica, wollastonite, magnesium hydroxide, aluminum hydroxide, glass fiber and alumina fiber.

10. A composition according to claim 1, wherein at least 50% by weight of the inorganic filler consists of glass fiber or alumina fiber or the mixture thereof.

11. A composition according to claim 1, which further comprises a silane coupling agent.

12. A phenolic resin composition comprising 20-40 parts by weight of a resole type phenolic resin, 5-15 parts by weight of a novolac type phenolic resin, 3-10 parts by weight of a carboxy-modified acrylonitrile-butadiene rubber and 35-65 parts by weight of an inorganic filler, with the proviso that said composition does not contain hexamethylenetetramine.

13. A composition according to claim 12, wherein the resole type phenolic resin is a dimethylene ether resole type phenolic resin or a methyol resole type phenolic resin or a mixture thereof.

14. A composition according to claim 12, wherein the novolac type phenolic resin has a weight-average molecular weight of 4,000-9,000.

15. A composition according to claim 12, wherein the weight ratio of the resole type phenolic resin to the novolac type phenolic resin is 70/30 to 80/20.

16. A composition according to claim 12, wherein the proportion of carboxyl group in the carboxy-modified acrylonitrile-butadiene rubber is 2-10 mole%.

17. A composition according to claim 12, wherein the carboxy-modified acrylonitrile-butadiene rubber has a number-average molecular weight of about 250,000-350,000.

18. A composition according to claim 12, wherein the inorganic filler is selected from the group consisting of calcium carbonate, calcined clay, uncalcined clay, mica, silica, wollastonite, magnesium hydroxide, aluminum hydroxide, glass fiber and alumina fiber.

19. A composition according to claim 12, wherein at least 50% by weight of the inorganic filler consists of glass fiber or alumina fiber or the mixture thereof.

20. A composition according to claim 12, which further comprises a silane coupling agent.

* * * * *